US 6,879,774 B1

(12) United States Patent
Kirk

(10) Patent No.: US 6,879,774 B1
(45) Date of Patent: Apr. 12, 2005

(54) CONTENT SENSITIVE CONTROL OF ROTATING MEDIA

(75) Inventor: Steven B. Kirk, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/579,869

(22) Filed: May 26, 2000

(51) Int. Cl.⁷ .......................... H04N 5/85; H04N 5/781; H04N 5/91
(52) U.S. Cl. .......................... 386/125; 386/124; 386/46
(58) Field of Search .................. 386/125, 124, 386/126, 45, 40, 46, 68, 69, 70, 67, 82, 81, 1, 6; 369/53.35; H04N 5/85, 5/781, 5/91

(56) References Cited

U.S. PATENT DOCUMENTS

| 5,603,040 A | 2/1997 | Frager et al. ............... 395/750 |
| 5,771,390 A | 6/1998 | Walker et al. ......... 395/750.07 |
| 5,819,100 A | 10/1998 | Pearce .................... 395/750.05 |
| 5,893,048 A | 4/1999 | Pate et al. ..................... 702/56 |
| 2001/0046196 A1 * | 11/2001 | Mckernan ................ 369/53.35 |

OTHER PUBLICATIONS

Walker, Jim; Zeller, Charles, "Power Management Override For Portable Computers," filed Aug. 4, 1995; US Application No. 08/511871. (Copy not enclosed.).

* cited by examiner

*Primary Examiner*—Robert Chevalier
(74) *Attorney, Agent, or Firm*—Haynes and Boone, LLP

(57) ABSTRACT

A method and related computer system for content-sensitive control of rotating media. In one embodiment, a method includes decreasing a spin rate of a rotating source medium in response to the content of the rotating source medium. In one embodiment a system includes hardware and/or software used to effect the foregoing method. In one embodiment, the rotating source medium includes digital video disk.

29 Claims, 6 Drawing Sheets

Fig. 3

| | DISK LOCATION WHERE READ IS TO BEGIN | TIME WHEN READ REQUEST RECEIVED (START TIME) | TIME AT END OF READ (STOP TIME) FOR DISK SPINNING AT 10X | IDLE TIME BETWEEN READ REQUESTS | TIME AVERAGED RATE AT WHICH DATA REQUESTED |
|---|---|---|---|---|---|
| RECEIVE REQUEST FROM DATA PROCESSING BOARD TO READ .4587 MBYTES OF DATA | | 0.0 SECONDS | .033 SECONDS | | |
| | | | | .297 SECONDS | |
| RECEIVE REQUEST FROM DATA PROCESSING BOARD TO READ .4587 MBYTES OF DATA | | .33 SECONDS | .363 SECONDS | | |
| | | | | .297 SECONDS | |
| RECEIVE REQUEST FROM DATA PROCESSING BOARD TO READ .4587 MBYTES OF DATA | | .66 SECONDS | .693 SECONDS | | |
| | | | | .307 SECONDS | 1.376 MBYTES/ SECOND |
| RECEIVE REQUEST FROM DATA PROCESSING BOARD TO READ .4587 MBYTES OF DATA | | 1.0 SECONDS | 1.033 SECONDS | | |
| | | | | .297 SECONDS | |
| RECEIVE REQUEST FROM DATA PROCESSING BOARD TO READ .4587 MBYTES OF DATA | | 1.33 SECONDS | 1.363 SECONDS | | |
| | | | | .297 SECONDS | |
| RECEIVE REQUEST FROM DATA PROCESSING BOARD TO READ .4587 MBYTES OF DATA | | 1.66 SECONDS | 1.693 SECONDS | | |
| | | | | .307 SECONDS | 1.376 MBYTES/ SECOND |
| RECEIVE REQUEST FROM DATA PROCESSING BOARD TO READ .4587 MBYTES OF DATA | | 2.0 SECONDS | 2.033 SECONDS | | |

*Fig. 5*

| | DISK LOCATION WHERE READ IS TO BEGIN | TIME WHEN READ REQUEST RECEIVED (START TIME) | TIME AT END OF READ (STOP TIME) FOR DISK SPINNING AT 2X | IDLE TIME BETWEEN READ REQUESTS | TIME AVERAGED RATE AT WHICH DATA REQUESTED |
|---|---|---|---|---|---|
| RECEIVE REQUEST FROM DVD PROCESSING BOARD TO READ .4587 MBYTES OF DATA | | 0.0 SECONDS | .33 SECONDS | | |
| | | | | 0.0 SECONDS | |
| RECEIVE REQUEST FROM DVD PROCESSING BOARD TO READ .4587 MBYTES OF DATA | | .33 SECONDS | .66 SECONDS | | |
| | | | | 0.0 SECONDS | |
| RECEIVE REQUEST FROM DVD PROCESSING BOARD TO READ .4587 MBYTES OF DATA | | .66 SECONDS | 1.0 SECONDS | | |
| | | | | 0.0 SECONDS | 1.376 MBYTES/ SECOND |
| RECEIVE REQUEST FROM DVD PROCESSING BOARD TO READ .4587 MBYTES OF DATA | | 1.0 SECONDS | 1.33 SECONDS | | |
| | | | | 0.0 SECONDS | |
| RECEIVE REQUEST FROM DVD PROCESSING BOARD TO READ .4587 MBYTES OF DATA | | 1.33 SECONDS | 1.66 SECONDS | | |
| | | | | 0.0 SECONDS | |
| RECEIVE REQUEST FROM DVD PROCESSING BOARD TO READ .4587 MBYTES OF DATA | | 1.66 SECONDS | 2.0 SECONDS | | |
| | | | | 0.0 SECONDS | 1.376 MBYTES/ SECOND |
| RECEIVE REQUEST FROM DVD PROCESSING BOARD TO READ .4587 MBYTES OF DATA | | 2.0 SECONDS | 2.033 SECONDS | | |

CONTENT SENSITIVE CONTROL OF ROTATING MEDIA

BACKGROUND

The present disclosure relates, in general, to management of memory devices in data processing systems.

DESCRIPTION OF THE RELATED ART

Data processing systems are systems that manipulate, process, and store data and are notorious within the art. Personal computer systems, and their associated subsystems, constitute well known examples of data processing systems.

Personal computer systems typically utilize memory devices. One type of memory device so utilized is known in the art as a Digital Video Disk (DVD). A DVD is a type of optical disk, a storage medium from which data is read and to which it is written by lasers.

In operation, a DVD is spun at a high rate of speed by a DVD drive (a piece of hardware having at least a platter to hold the DVD, a motor for spinning it, and a laser and supporting hardware and software used to read digital data from the DVD's surface). DVDs were originally used as vehicles to store and play back full-length movies. However, relatively recently it has become common in the art to utilize DVD technology as a form of Read Only Memory (ROM).

Unlike the more traditional optical disk formats, where the original audio Compact Disk (CDs) format can be clearly differentiated from the subsequent Compact Disk Read Only Memory (CD-ROM) format by specific codes appearing on virtually every CD or CD-ROM, DVDs have no such clear differentiation. Accordingly, it is common in the art for computer system hardware and software vendors to just "spin" the DVD to its maximum velocity (which is almost always necessary when using the DVD as a ROM device, especially for near-real time computer simulations), and just read data from the disk at a slower rate if the DVD is being used in movie playback mode rather than in computer ROM mode.

It has been discovered that operation of DVD computer memory devices at maximum velocity consumes considerable amounts of power and produces considerable amounts of noise (e.g., engine and wind noise). It has also been noticed that such noise can be particularly troublesome when viewing a movie, particularly when viewing a movie using a portable computer system. It has also been noticed that the increased power consumption associated with spinning the DVD at its maximum rate can be particularly troublesome when viewing a movie via a portable computer system; for example many of today's portable computer systems do not have enough battery capacity to allow view of a complete DVD movie when the DVD drive is spinning the DVD at full velocity.

In light of the foregoing, a method and system provides for content sensitive control of DVDs such that both power and consumption and noise associated with DVDs can be reduced. In addition, it is to be understood that although DVDs are utilized herein to explain the method and system for sake of familiarity, the discussion herein is meant to apply to any technology by which a medium read by a playback device has no clearly defined manner/scheme in which a determination can be made that the medium does not require that the playback device be operated at its maximum rate.

SUMMARY

The disclosure provides a method and system for content sensitive control of DVDs such that both power consumption and noise associated with rotating media (such as DVDs) can be reduced.

In one embodiment, a method includes but is not limited to decreasing a spin rate of a rotating source medium in response to the content of the rotating source medium. In one embodiment a system includes but is not limited to hardware and/or software used to effect the foregoing method. In one embodiment, the rotating source medium includes but is not limited to a Digital Video Disk.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings.

FIG. 2 depicts a high-level logic flowchart showing a process wherein drive speed of a DVD is adjusted dependent upon the content of the DVD.

FIGS. 3 depicts a table illustrating a pattern of read requests received by DVD drive controller/microprocessor 108 from data processing system main board 126.

The use of the same reference symbols in different drawings indicates similar or identical items.

DESCRIPTION OF THE PREFERRED EMBODIMENT(S)

The following sets forth a detailed description of the best contemplated mode for carrying out the embodiments described herein. The description is intended to be illustrative and should not be taken to be limiting.

Figure 1:
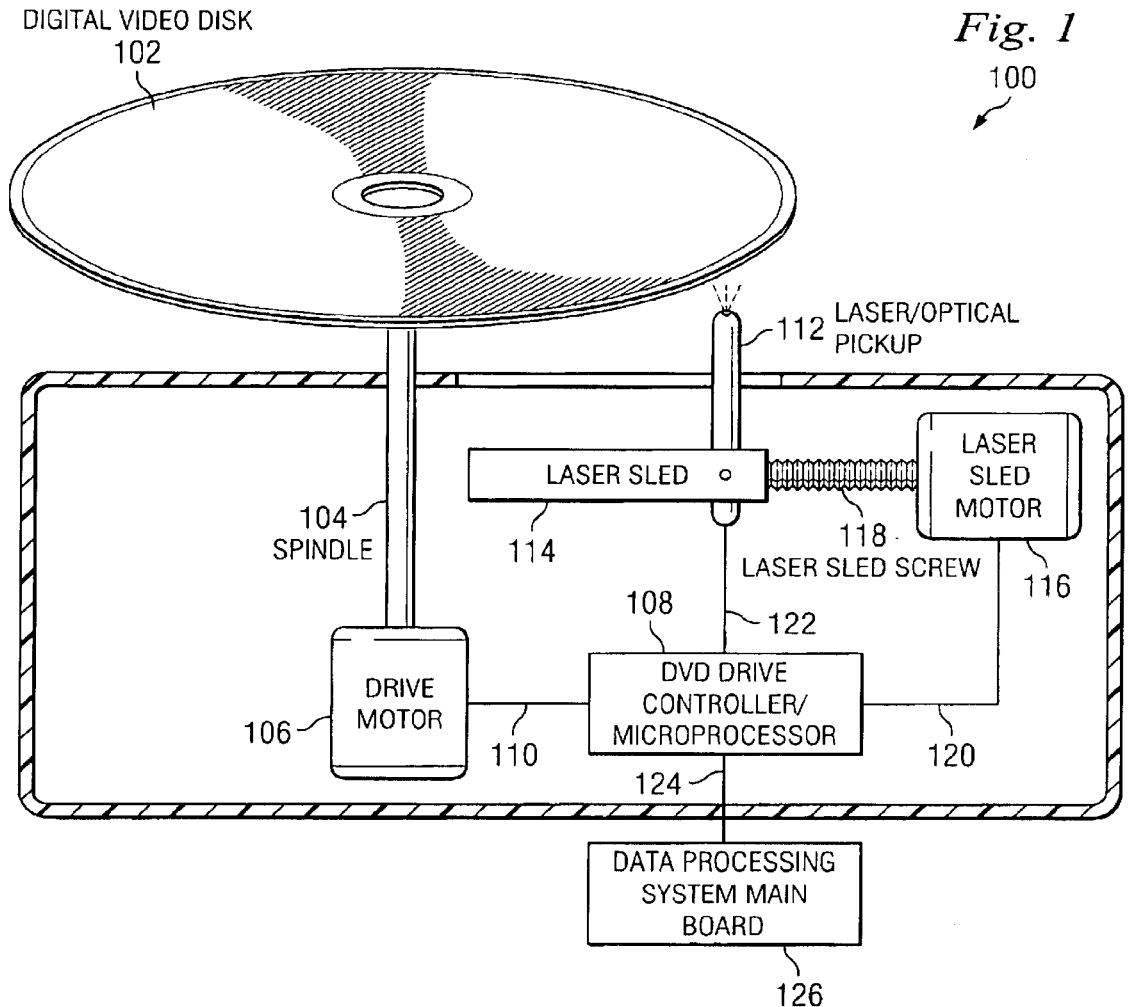
FIG. 1 shows a component-level diagram of DVD drive 100 having resident within it DVD 102.

With reference now to FIG. 1, shown is a component-level diagram of DVD drive 100 having resident within it DVD 102. Depicted is that DVD 102 sits securely upon a platter (not shown) which is affixed to spindle 104, which is driven, or "spun," by drive motor 106; thus, since DVD 102 is in mechanical articulation with spindle 104 through DVD's 102 contact with the platter (not shown) the rate of rotation of DVD 102 can be controlled by controlling the speed at which drive motor 106 spins spindle 104. Illustrated is that drive motor 106 is monitored and controlled by DVD drive controller/microprocessor 108 via bus 110.

Shown is that DVD 102 is "read" by laser/optical pickup 112. Laser/optical pickup 112 is positioned along laser sled 114 by laser sled motor 116. Depicted is that laser sled motor 116 causes laser sled screw 118 to turn which positions laser/optical pickup 112 at the correct position to read data from DVD 102. Illustrated is that laser sled motor 116 is monitored and controlled by DVD drive controller/microprocessor 108 via bus 120.

Depicted is that DVD drive controller/microprocessor 108 reads data from laser/optical pickup 112 via bus 122. This data is read and passed to a component (which may be a main processor, a dedicated graphics processor, or some other type of processing equipment) on data processing system main board 126, via bus 124, in response to a request for data from data processing system main board 126. In order to assist with such data transfer, it is customary for DVD drive controller/microprocessor 108 to have some on-board or associated memory (not shown) with which it can buffer data.

In practice, each request for data received from data processing system main board 126 will consist of a request for a certain block of data from a certain memory location. Ordinarily, DVD will be spinning at full speed, so if the data processing system main board 126 requests data at a lower rate than that available with the DVD spinning at full speed, the system reads no data with the DVD spinning at full velocity a significant percentage of the time (i.e., is idle).

Referring now to FIG. 2, shown is a high-level logic flowchart showing a process wherein drive speed of a DVD is adjusted dependent upon the content of the DVD. Method step 200 shows the start of the process. Method step 202 depicts monitoring requests for data received by DVD drive controller/microprocessor 108 from data processing system main board 126 (which may in fact be the main board of the data processing system or which may be the main board of a dedicated graphics processing system, depending upon implementation), such as was discussed in relation to FIG. 1. Thereafter, method step 204 shows an inquiry as to whether the requests for data over some defined time interval indicate that subsequent requests for data can be satisfied via a slower disk spin rate; in one embodiment a log is kept of requests for data used to determine if the historical trend of such data requests indicates that the size and rates of requested data blocks per unit(s) of time and the locations from which the requested data blocks were read will allow future requests for data blocks to be satisfied via a lower spin rate and buffering of data in either existing memory of DVD drive controller/microprocessor 108 or memory added to DVD drive 100 expressly for buffering such data.

In the event that the inquiry depicted in method step 204 does indicate that earlier requests for data over some defined time interval indicate that subsequent requests for data can NOT be satisfied via a slower disk spin rate, the process proceeds to method step 202 and proceeds from that point. However, in the event the inquiry depicted in method step 204 does indicate that requests for data over some defined time interval indicate that subsequent requests for data can be satisfied via a slower disk spin rate, the process proceeds to method step 206.

Method step 206 illustrates decreasing spin rate and (optionally) increasing or varying size of data blocks read such that expected future request for data blocks can be satisfied; exactly what spin rate and data size blocks will be read will vary from implementation to implementation, but in general the desire will be for the largest read block and the slowest spin rate that can be used to satisfy the data processing system main board's 126 requests for data will be preferable, since in general spinning the disk generally requires more energy than reading the data from the spinning disk). Subsequently, shown is that the process proceeds to method step 208 wherein is depicted that the larger data blocks read at the lower spin rate are buffered. Thereafter, illustrated is that the process proceeds to method step 210 wherein it is shown an inquiry as to whether subsequently received requests for data can be satisfied from the buffered data.

In the event that the inquiry shown in method step 210 yields a determination that a subsequently received request can NOT be satisfied from the buffered data (such as if data processing system main board 126 changes the fashion (e.g., the rate and/or addressing strategy) by which it is requesting data), depicted is that the process proceeds to method step 212 wherein it is illustrated that the disk is spun to its maximum velocity and normal DVD operations are resumed. Thereafter, shown is that the process proceeds to method step 206, after which the process proceeds as described previously.

In the event that the inquiry shown in method step 210 yields a determination that a subsequently received request CAN be satisfied from the buffered data, depicted is that the process proceeds to method step 214 wherein is illustrated that the subsequent requests for data are satisfied from the buffered data. Thereafter, depicted is that the process proceeds to method step 210 after which it proceeds in the fashion described previously.

Referring now to FIG. 3, shown is a table illustrating a pattern of read requests received by DVD drive controller/microprocessor 108 from data processing system main board 126. Shown is that DVD drive controller/microprocessor 108 is spinning its disk at 10X; in DVD parlance, "X" is the base rate associated with reading data (e.g., playing a movie) from a DVD, which equates to a read rate of 1.376 Mbytes/sec from the DVD.

Depicted in the far-left-hand column is that at various times DVD drive controller/microprocessor 108 receives requests for 0.4587 Mbytes blocks of data from data processing system main board 126 at various instances in time (denoted by "time when read request received column"). Illustrated is that, insofar as the disk is spinning at 10X (equating to a read rate of 13.76 Mbytes/sec), reading a 0.4587 Mbytes block requires approximately 0.033 seconds (a fact illustrated by the time difference between "time of end of read" and the "time when read request received" columns).

Illustrated is that, on average, the received requests for data equate to an average rate of request of 1.376 Mbytes per second (note that this average can be obtained over 1 second of requests or several seconds or requests, depending on implementation). Note that this rate equates to the substantially minimum rate required for a DVD. Note also that when the disk is spinning at 10X, there is a significant percentage of time during which the read mechanism of the DVD drive will remain idle (illustrated by "idle time between read requests" column). The inventor has found that by slowing down the disk, it is possible to still satisfy the requests for data by the data processing system main board 126 in a way that will be transparent to the data processing system main board 126.

Figure 4:
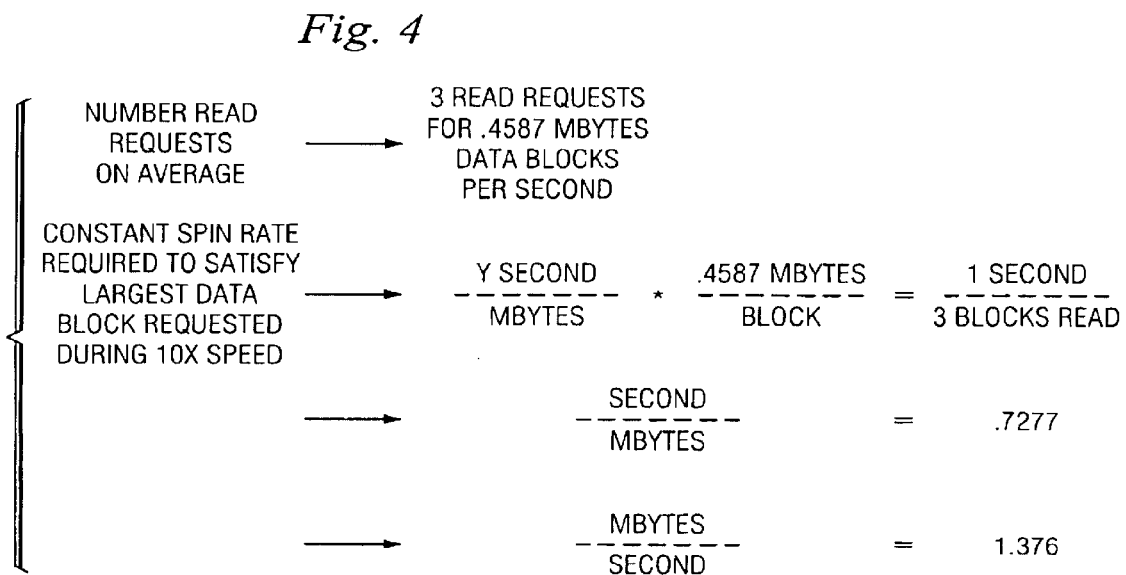
FIG. 4 shows a calculation to determine a slower rate at which the DVD may be spun which will still allow the satisfaction of requests for data by data processing system main board 126.

With reference now to FIG. 4, illustrated is a calculation to determine a slower rate at which the DVD may be spun which will still allow the satisfaction of request for data by data processing system main board 126. Insofar as that the largest block requested by data processing system main board 126 was 0.4587 Mbytes, and that there are three such requests received per second, the calculation shown in FIG. 4 illustrates that the disk must spin at least at the speed of 1.376 Mbytes/sec in order for the 0.4587 Mbytes block to be ready when each read request is received.

It has been mentioned that it is desired that the more slowly spinning disk is to be essentially transparent to data processing main board 126. Insofar as at 1X speed the disk is spinning far too slowly to satisfy the request in real time exactly as it was when the disk was spinning at 10X, in one embodiment the DVD drive controller/microprocessor 108 "leads" the requests for data by reading and buffering data so that the data is ready and buffered when each request for data is received, thus allowing the DVD drive to answer the request for data in a response time substantially analogous to that of the disk running at 10X. In one embodiment, this leading is achieved by reading and buffering several blocks of data at a high spin rate (e.g., 10X), and using such buffered data to satisfy requests for data while the disk is being spun down and configured such that the DVD drive is leading the requests for data so that the DVD drive can have at least one block of buffered data ready prior to each request for data by data processing system main board 126.

Figure 5:
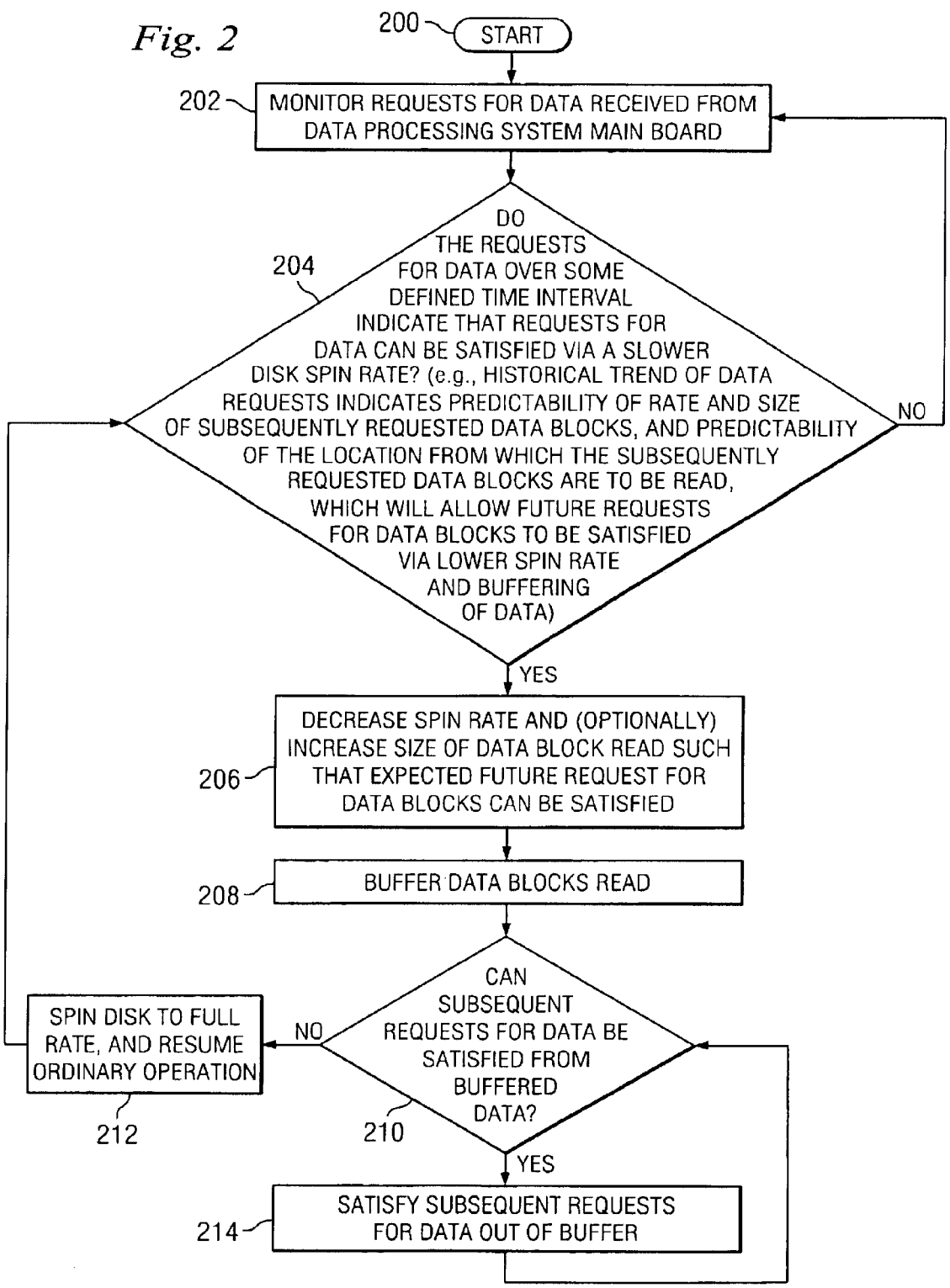
FIG. 5 depicts the table of FIG. 4, modified to show the disk spin rate set at 1X.

Referring now to FIG. 5, shown is the table of FIG. 4, modified to show the disk spin rate set at 1X. Depicted is that whereas the start time of the request for data stays the same (the start time being controlled by the data processing system main board 126), the "time at end of read" is far different, and indicates that the DVD drive is virtually constantly reading from the disk. Again, insofar as such read rate will not allow the response to the requests analogous to that available in the 10X system, it is assumed that the reads of data are in anticipation of the next read request for data, not the read request depicted contemporaneously with the read. For example, the read process occurring between 0 and 0.33 seconds is in anticipation of (and hence completed before) the read request occurring at 0.33 seconds, while the read process occurring during 0.33 and 0.66 seconds is in anticipation of (and hence completed before) the read process occurring during 0.66 and 1 second, etc.

Note that while the foregoing attempts to satisfy the requests for data at a 1X speed, the disk could also be spun at 2X, which would substantially assure that the buffering could be achieved and that the system would substantially always be able to satisfy the requests, since the 2X speed would allow two data blocks to be read between each received request for data, assuming near-constant reading. In addition to the foregoing, note that there is nothing that requires that the size of the data block be the same as the size of the requested data block; that is, since the request will be satisfied out of buffered data, the size of the blocks of data read and the size of the blocks of data requested can vary. Thus, the spin rate, the size of data blocks read, and the frequency with which data blocks are to be read are all design choices within the purview of the system designer, provided that the designer varies such parameters to ensure that the system can satisfy the requests for data expected to be received from data processing system main board 126

Figure 6:
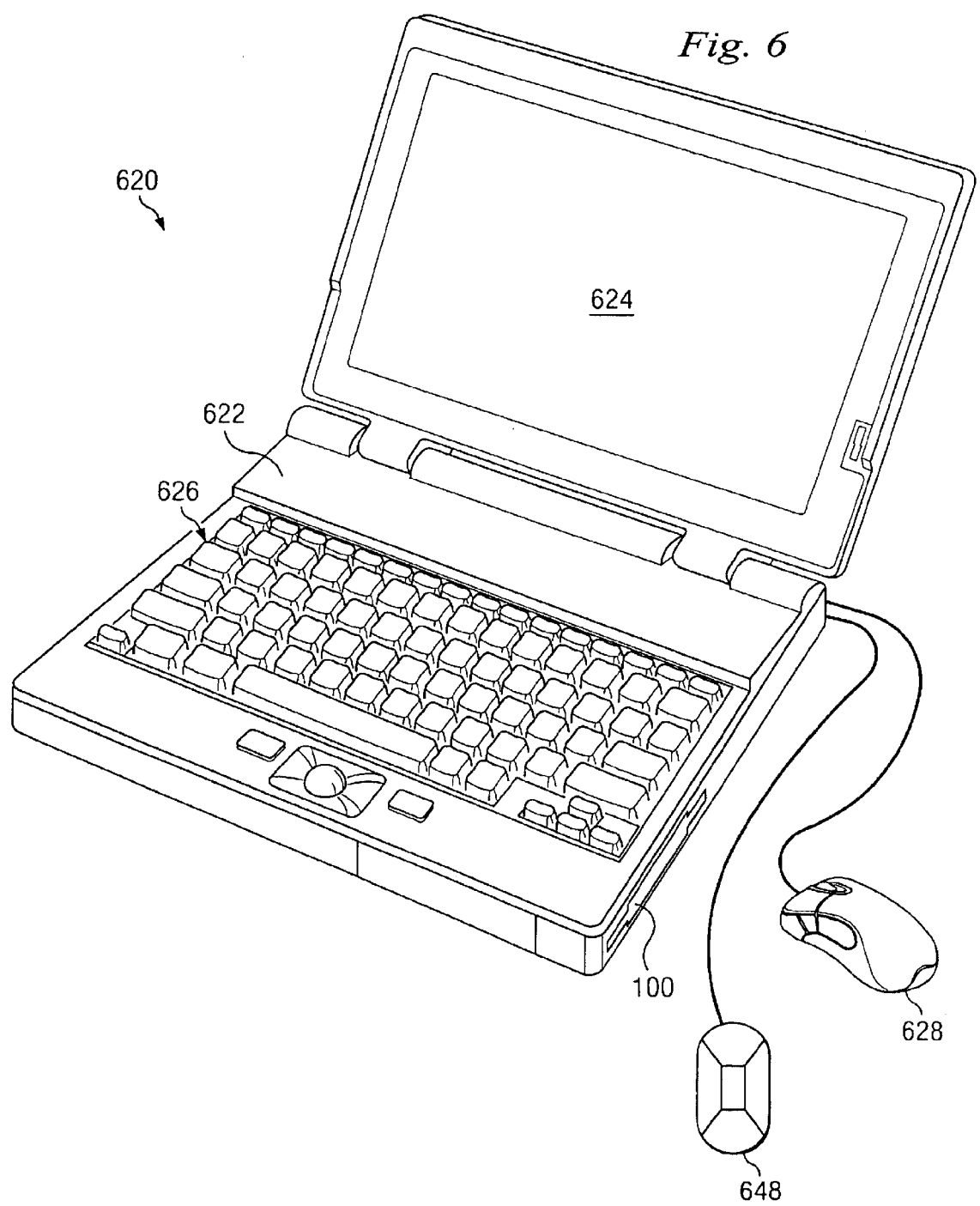
FIG. 6 illustrates a pictorial representation of a conventional data processing system which can be utilized in accordance with illustrative embodiments of embodiments described herein.

With reference now to FIG. 6, depicted is a pictorial representation of a conventional data processing system which can be utilized in accordance with illustrative embodiments of the processes described herein. It should be noted that a graphical user interface systems (e.g., Microsoft Windows 98 or Microsoft Windows NT operating systems) and methods can be utilized with the data processing system depicted in FIG. 6. Data processing system 620 is depicted which includes system unit housing 622, video display device 624, keyboard 626, mouse 628, microphone 648, and DVD drive 100. Data processing system 620 may be implemented utilizing any suitable computer such as a DELL portable computer system, a product of Dell Computer Corporation, located in Round Rock, Tex. Dell is a trademark of Dell Computer Corporation. Those skilled in the art will recognize that such conventional computer systems will generally have a main data processing system board typically including by not limited to at least one processor (e.g., main processor, graphics processor, sound processor, etc.), at least one memory (RAM, DRAM, ROM) and at least one communications device (e.g., a network card or modem).

Figure 7:
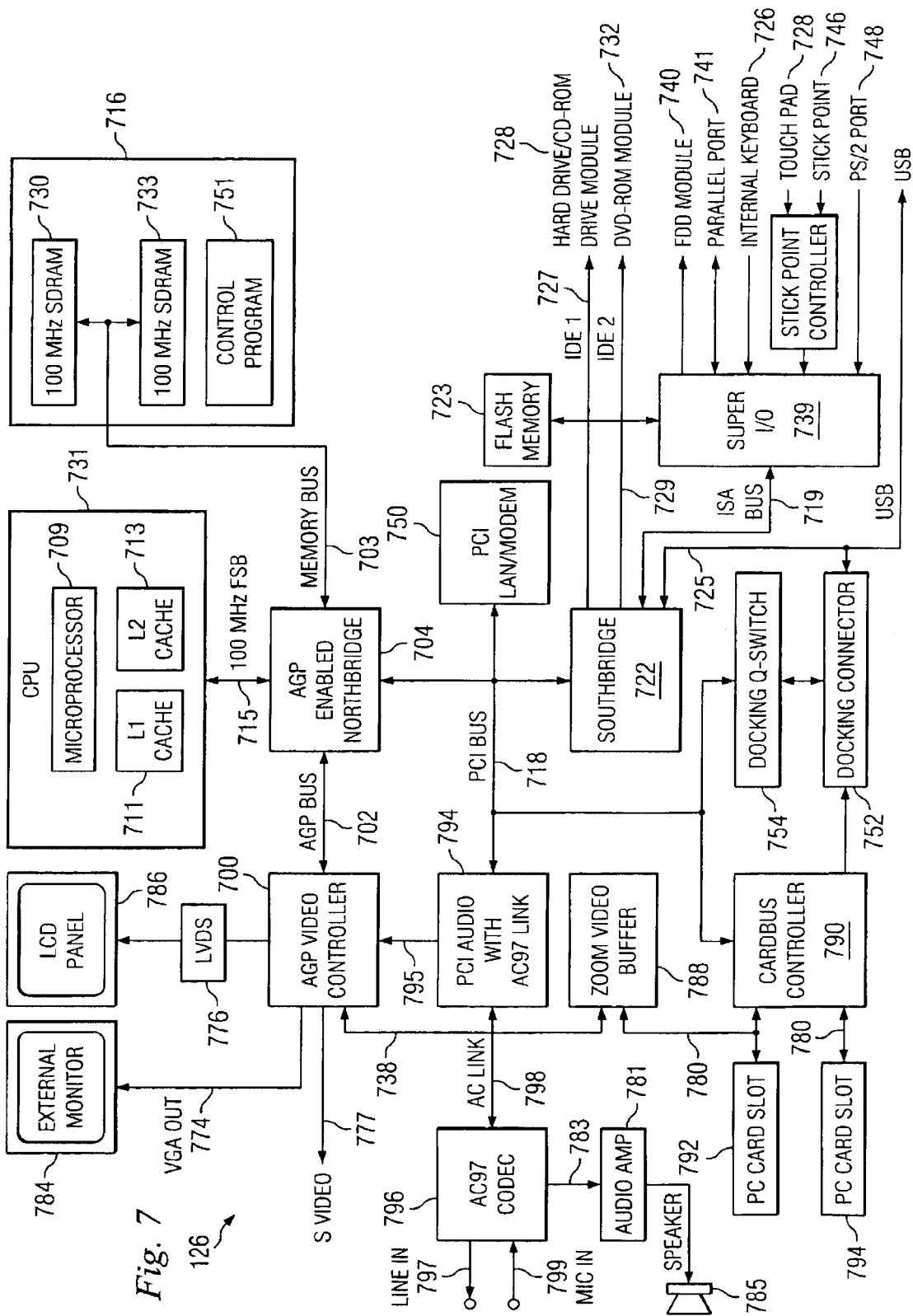
FIG. 7 illustrates data processing system main board 126 having selected components of data processing system 620 via which illustrative embodiments of the devices and processes described herein may be used and implemented.

Referring now to FIG. 7, depicted is data processing system main board 126 having selected components of data processing system 620 via which illustrative embodiments of the processes and devices described herein may be used and implemented. In light of the discussion herein, those skilled in the art will appreciate that while examples herein have described embodiments of processes and devices in a fashion compatible with software, hardware, and/or firmware resident within the confines of a DVD drive, those skilled in the art will recognize that the embodiments described herein can also be effected via hardware, software, and/or firmware resident within the confines of a data processing system standing alone but communicating with a DVD drive, or could likewise be effected in a distributed fashion among the hardware and/or software of a DVD drive and a data processing system.

Data processing system 620 includes Central Processing Unit ("CPU") 731 (wherein are depicted microprocessor 709, L1 Cache 711, and L2 Cache 713). CPU 731 is coupled to CPU bus 715.

CPU bus 715 is coupled to AGP-enabled Northbridge 704, which serves as a "bridge" between CPU bus 715, AGP interconnect (or bus) 702 (a type of data bus), and system memory bus 703. In going from one type of bus to another type of bus, a "bridge" is generally needed because the two different type buses speak a different "language." The term "AGP-enabled" is intended to mean that the so-referenced components are engineered such that they interface and function under the standards defined within the AGP interface specification (Intel Corporation, *Accelerated Graphics Port Interface Specification*).

Generally, each bus in a system utilizes an independent set of protocols (or rules) to conduct data, which are generally set forth in a product specification uniquely tailored to the type of bus in question (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface)

through which the two different types of buses are connected. This is one of the functions of AGP-enabled Northbridge 704, as well as the Southbridge 722, in that it is to be understood that such bridges can translate and coordinate between various data buses and/or devices which communicate through the bridges.

AGP interconnect 702 interfaces with AGP-enabled video controller 700, which respectively interconnects with video display devices external monitor 784 and LCD (Liquid Crystal Display) panel 786 (each of which are specific illustrations of the more general video display device 624) through VGA (Video Graphics Array) out) 774 and LVDS bus 776 (which may be composed, at least in part, by a Flexible Printed Circuit having traces). AGP-enabled video controller 700 also is depicted with S-Video out jack 777. AGP-enabled video controller 700 also is depicted as interconnected with zoom video buffer 788 via zoom video buffer bus 778. Zoom video buffer 788 is illustrated as interconnected with cardbus controller 790 via cardbus controller lines 780. Shown is that cardbus controller lines 780 connect cardbus controller 790 with PCI card slots 792 and 794.

Shown is that AGP-enabled video controller 700 interconnects with PCI audio w/AC97 link 794 via PCI audio-AGP video bus 795. Depicted is that PCI audio w/AC97 link 794 interconnects with AC97 CODEC 796 via AC97 link 798. Illustrated is that AC97 CODEC 796 has line in jack 797 and mic in jack 799. Depicted is that AC97 CODEC 796 interfaces with audio amp 781 via AC97 CODEC-audio amp bus 783. Illustrated is that audio amp 781 drives speaker 785.

AGP-enabled Northbridge 704 interfaces with system memory bus 703. System memory bus 703 interfaces with system memory 716, which can contain various types of memory devices such as SDRAM chips 730 and 733, but which also can contain DRAM, Rambus DRAM, and other type memory chips. In addition, shown for sake of illustration is that data processing system 620 includes control program 751 which resides within system memory 716 and which is executed and/or operated on by CPU 731. Control program 751 contains instructions that when executed on CPU 731 carries out application program (e.g., videoconferencing software, or an application program embodying all or part of the processes described above) operations.

AGP-enabled Northbridge 704 interfaces with Peripheral Component Interconnect (PCI) bus 718, upon which are shown PCI Input-Output (I/O) devices PCI LAN/modem card 750, PCI Audio w/AC97 link 794, cardbus controller 790, and docking Q switch 754 which is depicted as electrically connected with docking connector 752. Docking connector 752 is also shown electrically connected with cardbus controller 790 and universal serial bus (USB) 725.

Depicted is that Peripheral Component Interconnect (PCI) bus 718 interfaces with Southbridge 722.

Southbridge 722 serves as a bridge between PCI bus 718 and I/O (or ISA) bus 719, universal serial bus USB 725, and Integrated Drive Electronics (IDE)connectors 727 and 729, which respectively connect with hard drive CD-ROM module 728 and DVD-ROM module 732.

I/O bus 719 interfaces with super I/O controller 739. Further shown is that super I/O controller 739 connects devices flash memory 723, FDD (floppy disk drive) module 740, parallel port 741, internal keyboard 726, mouse or touchpad 728, stick point 746, and PS/2 port 748 to I/O bus 719.

Data processing system 920 typically contains logic defining at least one graphical user interface, and any suitable machine-readable media may retain the graphical user interface, such as SDRAM 730, ROM, a magnetic diskette, magnetic tape, or optical disk. Any suitable operating system such as one having an associated graphical user interface (e.g., Microsoft Windows or Microsoft NT) may direct CPU 731. Other technologies can also be utilized in conjunction with CPU 731, such as touch-screen technology or human voice control.

Those skilled in the art will appreciate that the hardware depicted in FIG. 7 may vary for specific applications. For example, other peripheral devices such as optical disk media, audio adapters, video cameras such as those used in videoconferencing, or programmable devices, such as PAL or EPROM programming devices well-known in the art of computer hardware, and the like may be utilized in addition to or in place of the hardware already depicted.

Those skilled in the art will recognize that data processing system 620 can be described in relation to data processing systems which perform essentially the same functions, irrespective of architectures.

The foregoing components and devices are used herein as examples for sake of conceptual clarity. Thus, CPU 731 is utilized as an exemplar of any general processing unit, including but not limited to multiprocessor units; CPU bus 715 is utilized as an exemplar of any processing bus, including but not limited to multiprocessor buses; PCI devices attached to PCI bus 718 are utilized as exemplars of any input-output devices attached to any I/O bus; AGP Interconnect 702 is utilized as an exemplar of any graphics bus; AGP-enabled video controller 700 is utilized as an exemplar of any video controller; Northbridge 704 and Southbridge 722 are utilized as exemplars of any type of bridge; and PCI LAN/modem card 750 is used is intended to serve as an exemplar of any type of synchronous or asynchronous input-output card. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

The foregoing detailed description has set forth various embodiments via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present disclosure may be implemented via logic encoded in a BIOS associated with a processor such as a DVD controller/microprocessor, while in another embodiment the present disclosure may be implemented via logic encoded in Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and or writing the code for the software or firmware would be well within the skill of one of ordinary skill in the art in light of this disclosure. In addition, those skilled in the art will appreciate that the mechanisms of the present disclosure are capable of being distributed as a program product in a variety of forms, and that an illustrative embodiment of the present disclosure applies equally regardless of the particular type of signal bearing media used to actually carry out the distribution. Examples of a signal bearing media include by are not limited to the following: recordable type media such as floppy disks, hard disk drives, CD ROMs, digital tape, and transmission type media such as digital and analogue communication links using TDM or IP based communication links (e.g., packet links).

The foregoing described embodiments depict different components contained within, or connected with, different other components. It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Other embodiments are within the following claims.

While particular embodiments of the present disclosure have been shown and described, it will be obvious to those skilled in the art that, based upon the teachings herein, changes and modifications may be made without departing from this disclosure and its broader aspects and, therefore, the appended claims are to encompass within their scope all such changes and modifications as are within the true spirit and scope of this disclosure. Furthermore, it is to be understood that the disclosure is solely defined by the appended claims. It will be understood by those within the art that if a specific number of an introduced claim element is intended, such an intent will be explicitly recited in the claim, and in the absence of such recitation no such intent is present. For example, as and aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method comprising:
    decreasing a spin rate of a rotating source medium in response to the content of the rotating source medium;
    determining a minimum data transfer rate sufficient to service regular requests for data;
    lowering a data transfer rate associated with a rotating source medium, in response to the minimum data transfer rate; and
    averaging at least two requests for data over at least one interval of time.

2. The method of claim 1, wherein said decreasing a spin rate of a rotating source medium in response to the content of the rotating source medium further comprises:
    decreasing a spin rate of a digital video disk.

3. The method of claim 1, wherein said decreasing a spin rate of a rotating source medium in response to the content of the rotating source medium further comprises:
    decreasing a spin rate of a rotating source medium in response to the content of the rotating source medium comprising a movie.

4. The method of claim 1, wherein said determining a minimum data transfer rate sufficient to service regular requests for data further comprises:
    determining a minimum rate of rotation sufficient to service the consistent periodic requests for data.

5. The method of claim 1, wherein said lowering a data transfer rate associated with a rotating source medium, in response to the minimum data transfer rate further comprises:
    lowering a spin rate of the rotating source medium.

6. The method of claim 1, wherein said lowering a data transfer rate associated with a rotating source medium, in response to the minimum data transfer rate further comprises:
    buffering data read from the rotating source medium.

7. The method of claim 1, wherein said lowering a data transfer rate associated with a rotation source medium, in response to the minimum data transfer rate further comprises:
    varying the size of data blocks read from the rotating source medium.

8. A computer system comprising:
    signal bearing media bearing means for decreasing a spin rate of a rotating source medium in response to the content of the rotating source medium;
    means for determining a minimum data transfer rate sufficient to service regular requests for data;
    means for lowering a data transfer rate associated with a rotating source medium, in response to the minimum data transfer rate; and
    means for averaging at least two requests for data over at least one interval of time.

9. The computer system of claim 8, wherein said signal bearing media further includes:
    recordable media selected from the group comprising a hard drive, a Compact Disk, a read only memory, a random access memory, and a floppy disk.

10. The computer system of claim 8, wherein said signal bearing media further includes:
    transmission media selected from the group comprising a web site, a computer file, and random access memory.

11. The computer system of claim 8, wherein said means for decreasing a spin rate of a rotating source medium in response to the content of the rotating source medium further includes:
    means for accepting user input specifying at least one application program to be run on a data processing system.

12. The computer system of claim 8, wherein said means for decreasing a spin rate of a rotating source medium in response to the content of the rotating source medium further comprises:
    means for decreasing a spin rate of a digital video disk.

13. The computer system of claim 8, wherein said means for decreasing a spin rate of a rotating source medium in response to the content of the rotating source medium further comprises:
    means for decreasing a spin rate of a rotating source medium in response to the content of the rotating source medium comprising a movie.

14. The computer system of claim 8, wherein said means for determining a minimum data transfer rate sufficient to service regular requests for data further comprises:
   means for determining a minimum rate of rotation sufficient to service the consistent periodic requests for data.

15. The computer system of claim 8, wherein said means for lowering a data transfer rate associated with a rotating source medium, in response to the minimum data transfer rate further comprises:
   means for lowering a spin rate of the rotating source medium.

16. The computer system of claim 8, wherein said means for lowering a data transfer rate associated with a rotating source medium, in response to the minimum data transfer rate further comprises:
   means for buffering data read from the rotating source medium.

17. The computer system of claim 8, wherein said means for lowering a data transfer rate associated with a rotating source medium, in response to the minimum data transfer rate further comprises:
   means for varying the size of data blocks read from the rotating source medium.

18. A computer system comprising:
   one or more printed circuit board components mounted on at least one printed circuit board, said one or more printed circuit board components selected from the group comprising a microprocessor, a memory, a graphics processor, a bus structure, and a communications adapter;
   the memory comprising programming adapted to decrease a spin rate of a rotating source medium in response to the content of the rotating source medium;
   programming adapted to determine a minimum data transfer rate sufficient to service regular requests for data;
   programming adapted to lower a data transfer rate associated with a rotating source medium, in response to the minimum data transfer rate; and
   programming adapted to average at least two requests for data over at least one interval of time.

19. The computer system of claim 18, wherein the memory comprises at least one memory device selected from the group comprising a random access memory, a magnetic disk drive, an optical disk drive, a read only memory, one or more integrated circuits, or any one or more of the foregoing memory devices located on second computer system.

20. The computer system of claim 18, wherein the programming comprises one or more of the following: one or more software routines, one or more hardware devices, and a combination of software and hardware devices adapted to effect the decreasing a spin rate of a rotating source medium in response to the content of the rotating source medium.

21. The computer system of claim 18, wherein said programming adapted to decrease a spin rate of a rotating source medium in response to the content of the rotating source medium further comprises:
   programming adapted to decrease a spin rate of a digital video disk.

22. The computer system of claim 18, wherein said programming adapted to decrease a spin rate of a rotating source medium in response to the content of the rotating source medium further comprises:
   programming adapted to decrease a spin rate of a rotating source medium in response to the content of the rotating source medium comprising a movie.

23. The computer system of claim 18, wherein said programming adapted to determine a minimum data transfer rate sufficient to service regular requests for data further comprises:
   programming adapted to determine a minimum rate of rotation sufficient to service the consistent periodic requests for data.

24. The computer system of claim 18, wherein said programming adapted to lower a data transfer rate associated with a rotating source medium, in response to the minimum data transfer rate further comprises:
   programming adapted to lower a spin rate of the rotating source medium.

25. The computer system of claim 18, wherein said programming adapted to lower a data transfer rate associated with a rotating source medium, in response to the minimum data transfer rate further comprises:
   programming adapted to buffer data read from the rotating source medium.

26. The computer system of claim 18, wherein said programming adapted to lower a data transfer rate associated with a rotating source medium, in response to the minimum data transfer rate further comprises:
   programming adapted to vary the size of data blocks read from the rotating source medium.

27. A method comprising:
   decreasing a spin rate of a rotating source medium in response to the content of the rotating source medium;
   determining a minimum data transfer rate sufficient to service regular requests for data;
   lowering a data transfer rate associated with a rotating source medium, in response to the minimum data transfer rate; and
   varying the size of data blocks read from the rotating source medium.

28. A computer system comprising:
   signal bearing media bearing means for decreasing a spin rate of a rotating source medium in response to the content of the rotating source medium;
   means for determining a minimum data transfer rate sufficient to service regular requests for data;
   means for lowering a data transfer rate associated with a rotating source medium, in response to the minimum data transfer rate; and
   means for varying the size of data blocks read from the rotating source medium.

29. A computer system comprising:
   one or more printed circuit board components mounted on at least one printed circuit board, said one or more printed circuit board components selected from the group comprising a microprocessor, a memory, a graphics processor, a bus structure, and a communications adapter;
   the memory comprising programming adapted to decrease a spin rate of a rotating source medium in response to the content of the rotating source medium;
   programming adapted to determine a minimum data transfer rate sufficient to service regular requests for data;
   programming adapted to lower a data transfer rate associated with a rotating source medium, in response to the minimum data transfer rate; and
   programming adapted to vary the size of data blocks read from the rotating source medium.

* * * * *